United States Patent
Holmes et al.

(10) Patent No.: US 6,421,700 B1
(45) Date of Patent: Jul. 16, 2002

(54) METHOD AND SYSTEM FOR WORK PROCESS SUPPORT USING INDEPENDENT SYSTEM AND USER STATES

(75) Inventors: James Holmes, London; Allan McLean, Bottisham; Alex Zbyslaw, Cambridge, all of (GB); Paul Dourish, San Francisco, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/091,366

(22) PCT Filed: Dec. 23, 1996

(86) PCT No.: PCT/GB96/03229

§ 371 (c)(1), (2), (4) Date: Aug. 27, 1999

(87) PCT Pub. No.: WO97/23837

PCT Pub. Date: Jul. 3, 1997

(30) Foreign Application Priority Data

| Dec. 22, 1995 | (GB) | 9526428 |
| Dec. 22, 1995 | (GB) | 9526429 |
| Dec. 22, 1995 | (GB) | 9526430 |
| Nov. 18, 1996 | (GB) | 9623899 |

(51) Int. Cl.$^7$ .............................................. G06F 9/00
(52) U.S. Cl. ......................... 709/100; 345/772; 345/839
(58) Field of Search ............................. 709/100, 101, 709/102, 103, 104, 106, 107; 345/839, 772, 965; 399/82

(56) References Cited

U.S. PATENT DOCUMENTS 5,301,320 A  4/1994  McAtee et al. ............. 709/180

FOREIGN PATENT DOCUMENTS

| EP | 0 335 638 A2 | 10/1989 |
| EP | 0 592 072 A2 | 4/1994 |

OTHER PUBLICATIONS

Baumann, L.S. et al., "Automated workflow control: a key to office productivity", AFIPS Conference Proceeedings, 1980 National Computer Conference, Anaheim, CA, May 19–22, pp. 549–554, XP002030336.

Primary Examiner—Majid Banankhah

(57) ABSTRACT

A method supporting work processes involving activities such as generation, alteration and authentication of documents. For each activity, the relationship between that activity and each other activity is defined in terms of at least one dependency from a plurality of dependencies. Each activity has a plurality of possible independent user and system states, for example three for the user states and three for the system states. The independence of the user and system states improves flexibility by introducing a mechanism to support reasoning over the process flow, so that discrepancies can be used to maintain a record of any mismatch.

18 Claims, 13 Drawing Sheets

Process tech-report

Activities submit-tech-report (anyof (/authors) )    *51*
check-clearance-form (oneof (/editors),
      relationships (validates submit-tech-report ) ) } *52*    *53*
check-peer-review(oneof (/editors ), relationships (validates submit-tech-report) )
copy-edit ( oneof ( /editors ),relationships ( validates submit-tech-report,
      after check-per-review ) ) } *54*
make-postscript (oneof ( /editors), relationships (after submit-tech-report) )
check-postscript (oneof ( /editors), relationships ( validates make-postscript) )
assign-number (oneof ( /publishers), resources (TR-number 1 ) )
produce-cover (oneof (/publishers), relationship (finishes-after assign-number) )
cover-sheet-review (oneof ( /publishers), relationships (validates produce-cover) )
attach-cover (oneof ( /publishers), relationships (after produce-cover,
      after make-postscript) )
make-hardcopy (oneof ( /publishers), relationships (after attach-cover)
put-copy-on-internal-web (oneof (/publishers), relationships (after attach-cover) )
preview-internal-web (oneof ( /publishers), relationships (validates
      put-copy-on-internal-web) )
put-copy-on-external-web (oneof (/publishers), relationships (after attach-cover) )
Preview-external-web (oneof ( /publishers, relationships (validates
      put-copy-on-external-web) )
check-copyright (oneof ( /editors),
      relationships (validates-before put-copy-on-external-web) )
check-report-is-on-web (oneof ( /publishers),
      relationships (validates put-copy-on-external-web,
            after preview-external-web) )
notify-mailing-list (oneof ( /publishers), relationships (after
      put-copy-on-internal-web) )
finish (nobody, relationship (after make-hardcopy,
      after put-copy-on-internal-web,
      after notify-mailing-list) )

*FIG. 10*

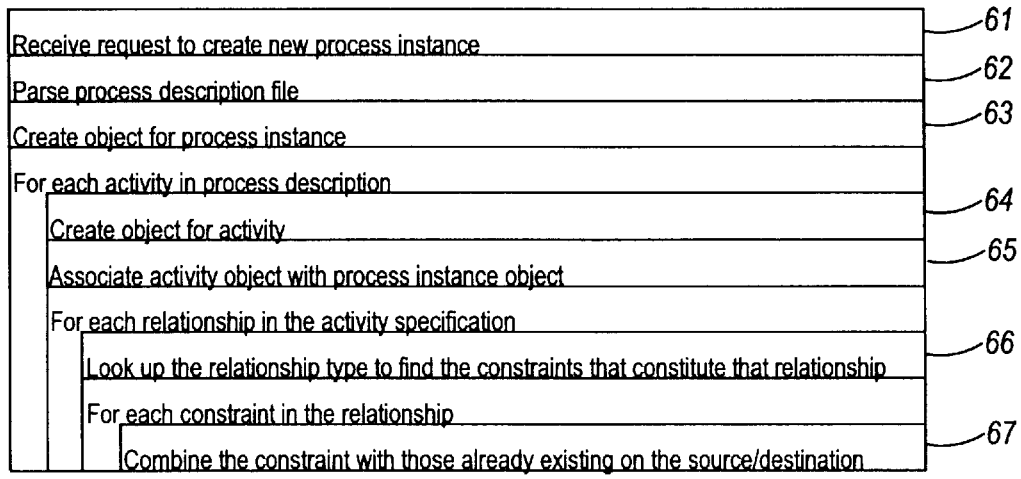

*FIG. 11*

METHOD AND SYSTEM FOR WORK PROCESS SUPPORT USING INDEPENDENT SYSTEM AND USER STATES

This invention relates to data processing, and more particularly to a systems and methods supporting processes involving activities such as generation, alteration, distribution, authentication and validation of documents. More particularly, the invention concerns such systems and methods providing representing and reasoning with independent user and system states for activities within a process, using typed dependencies to describe relationships between activities, and/or providing resolution of conflicts between what a user wants to do and a predetermined model of the activities.

It is not uncommon in the workplace for a process to be performed requiring input from or authorisation by a number of users. For example, it may be necessary for a report to be prepared by authors A, B and C, where B cannot make his contribution before A has completed his, and C cannot make his contribution before B has completed his. Furthermore, it may be necessary for persons to sign or otherwise give authenticity to the report, such that E cannot sign until D has given his authorisation. A multitude of combinations of requirements and constraints of this type are possible.

Existing systems for supporting the co-ordination of work, such as workflow systems, embody a model of how the work should be carried out, i.e. a predetermined model defining, inter alia, the order in which activities constituting a process are to be carried out, and, where appropriate, by whom. This is powerful in that it provides relatively systematic coverage of what may be a very complex set of work activities, but it has the serious problem in that the description of what should be done in the ideal case may not correspond to the most appropriate way of carrying out real instances of the work, which are driven more by the local contingencies around each particular case rather than idealised abstractions. This is especially true if the kind of work to be supported is knowledge intensive rather than highly routine.

Current process support systems, such as workflow systems, represent .work in terms of ordered sequences of activities. Although different systems use slightly different naming conventions, these activities can typically be in one of three states:

(a) Inactive, which means that the conditions for carrying out the activity have not yet been met.
(b) Active, which means that the activity is available to be worked on.
(c) Completed, which means that the activity has been carried out. This will be referred to as the "traditional" approach. Reasoning over these states is typically used to co-ordinate and control the process. When the activity is completed, the next activities (or activity) move from the Inactive state to the Active state, and when these are completed the next ones become Active, and so on until the entire process has been completed. This works fairly well for some highly repetitive and routine activities, but it is becoming more and more common to try to use process support technologies for work which has more knowledge intensive components and which requires more flexible interpretation of the activities and their interrelationships. In such cases, the above described model employed in the traditional approach is excessively rigid in the way it interprets the flow of work and in what it allows the user to do.

There is therefore a need for a system which addresses the above problem and provides increased flexibility.

The present invention provides a method carried out in a data processing system involving at least one activity, the activity being performed by at least one user, comprising: for the or each activity, assigning a user state from one of a plurality of user states, and assigning a system state from one of a plurality of system states, the system state and the user state being independent.

The method may include the step of changing the system state of the activity in response to a change in the user state, and vice versa.

The method may relate to at least a first and a second activity, each activity being performed by at least one user, the method comprising: for each activity, assigning a user state from one of a plurality of user states, and assigning a system state from one of a plurality of system states, the system state and the user state being independent, and changing the user state and/or system state of the second activity when the user state and/or system state of the first activity satisfy a predetermined condition.

The invention addresses the aforementioned problems by representing and reasoning with descriptions of what the user is actually doing as well as an idealised representation of the work.

An advantage of the invention is that this arrangement allows deviations from the normative process to be carried out routinely while maintaining a representation of any discrepancies between what is "supposed" to happen (according to a predetermined model of the process) and what is, "really" happening.

The invention improves flexibility by introducing a mechanism to support reasoning over the process flow using a parallel set of system and user states, so that the discrepancies can be used to maintain a record of any mismatch.

The present invention further provides a method, carried out in a data processing system, involving at least a first and a second activity, each activity being performed by at least one user, comprising: for each activity, defining a relationship between that activity and the or each other activity, said relationship being one of a plurality of predetermined different relationships.

Preferably, each activity has a plurality of associated states, the method further including the step of decomposing the or each relationship into a set of activities and a set of constraints between states of the activities.

The invention addresses the aforementioned problems by allowing the representation and implementation of a process model which combines richer semantics and avoids having to specify arbitrary relationships. This effectively defines a space of possible routes to achieve the work described rather than an arbitrary route through it.

The invention models work processes by defining relationships between activities which may be of different types. An advantage is that these types are defined to correspond more closely to relationships in the work (user) domain than in the system domain. This gives two benefits as far as the process modelling is concerned. First, it allows work to be modelled more accurately, thus reducing the mismatch between the model and the realities of how it is carried out. Second, although the increased number of distinctions which have to be made may increase the complexity for the modeller, this is countered by the fact that some relationships result in simpler models being possible.

Furthermore, in the traditional workflow model intended to embody such processes, little scope is left for a user to have control over the order in which activities are carried out. As the work being supported becomes more complex and knowledge intensive, the traditional model forces the user to carry it out in ways which may be sub-optimal for the local contingencies of particular instances of the work.

One solution which is sometimes used is to allow exceptions to the canonical process to be defined for particular instances (i.e. the process is redefined for these instances). However, if an excessive number of exceptions have to be defined, it suggests that the initial model of the work and its implementation is unsatisfactory. In fact, it is almost impossible to produce a model of work which is so accurate that it will faithfully describe the work supported under all circumstances. If it is made too open-ended, the structural support provided is likely to be so weak that it is not very helpful to the user.

There is therefore a need for a system which addresses the above problems.

The present invention further provides a method carried out in a data processing system involving at least a first and a second activity, each activity being performed by at least one user and having a plurality of possible states, comprising: for each activity detecting a change of state requested by a user, detecting whether the change of state conflicts with a predetermined model, and using an interactor to determine how to resolve any conflict so detected.

Preferably, the method includes the step of passing information about the conflict to the interactor, the interactor determining either that (1) the conflicting change should be accepted, or that (2) the user is to be authorised to determine whether or not he may deviate from the predetermined model.

The invention addresses the aforementioned problems by providing mechanisms for giving users more informed choice over the activities they carry out by allowing potential conflicts between what the user wants to do and the model of the work represented within the system to be resolved, by delegating decision making to the most appropriate place The invention achieves this by passing information about the conflict to the interactor, which can determine whether the conflict should be accepted, or can pass it on for the user to determine how appropriate it really is to deviate from the normative, predetermined model of the process. This contrasts with the traditional techniques in which the process model on its own determines whether or not a proposed activity is permissible.

Two embodiments implementing the mechanism are described. One relies on additional information about the relationships between activities- for a more detailed discussion of such dependencies, see section C below. The second technique makes use of conjoint representations of user behaviour and model-based states; for a detailed discussion of states assigned to activities, see section B below.

In particular embodiments, the method of the present invention may further comprise: for the or each activity, assigning a user state from one of a plurality of user states, assigning a system state from one of a plurality of system states, the system state and the user state being independent, and associating each system state so assigned with a plurality of assigned user states.

Each of the plurality of assigned user states may comprise an assigned user state a respective user.

The present invention extends the technique of using independent user and system states by enabling the representation of the state of activities of multiple independent users alongside the system state. This extends functionality by allowing, for example, the support of activities which require collaboration among multiple users such as co-authoring; increased flexibility in the granularity at which activities are represented; and improved awareness of other users who might be in a position to carry out an activity.

These techniques can be used where multiple workers may have some role to play in completing a given activity. For example, improved awareness of other users who might be in a position to carry out an activity; the support of activities which require collaboration among multiple users such as co-authoring; increased flexibility in the granularity at which activities are represented (e.g. by representing a complex database update in relation to the set of users who have the information required to perform it). [Co-ordination of access to change. text or a database is not directly supported. by the present invention, although it can be used to give feedback on current status. More specific access or locking controls can be implemented via techniques well known in the art.]

Alternatively, the plurality of assigned user states may comprise a plurality of chronologically sequential user assigned user states, and may include the currently assigned user state.

Known techniques do not have any mechanism for tracking the history of interaction with an activity. The invention also extends the techniques already described by enabling the representation of a number of parallel "micro-participations" for each user involved in an activity. This allows the history of interaction to be recorded, for example, to support any necessary rework or to support reflection on the process.

The invention further provides a programmable data processing system including processing means, memory and a user interface, when suitably programmed for carrying out the method of any of the appended claims, or according to any of the particular embodiments described herein.

Embodiments of the invention will now be described, by way of example, with reference to the accompanying drawings, in which.

Figure 1:
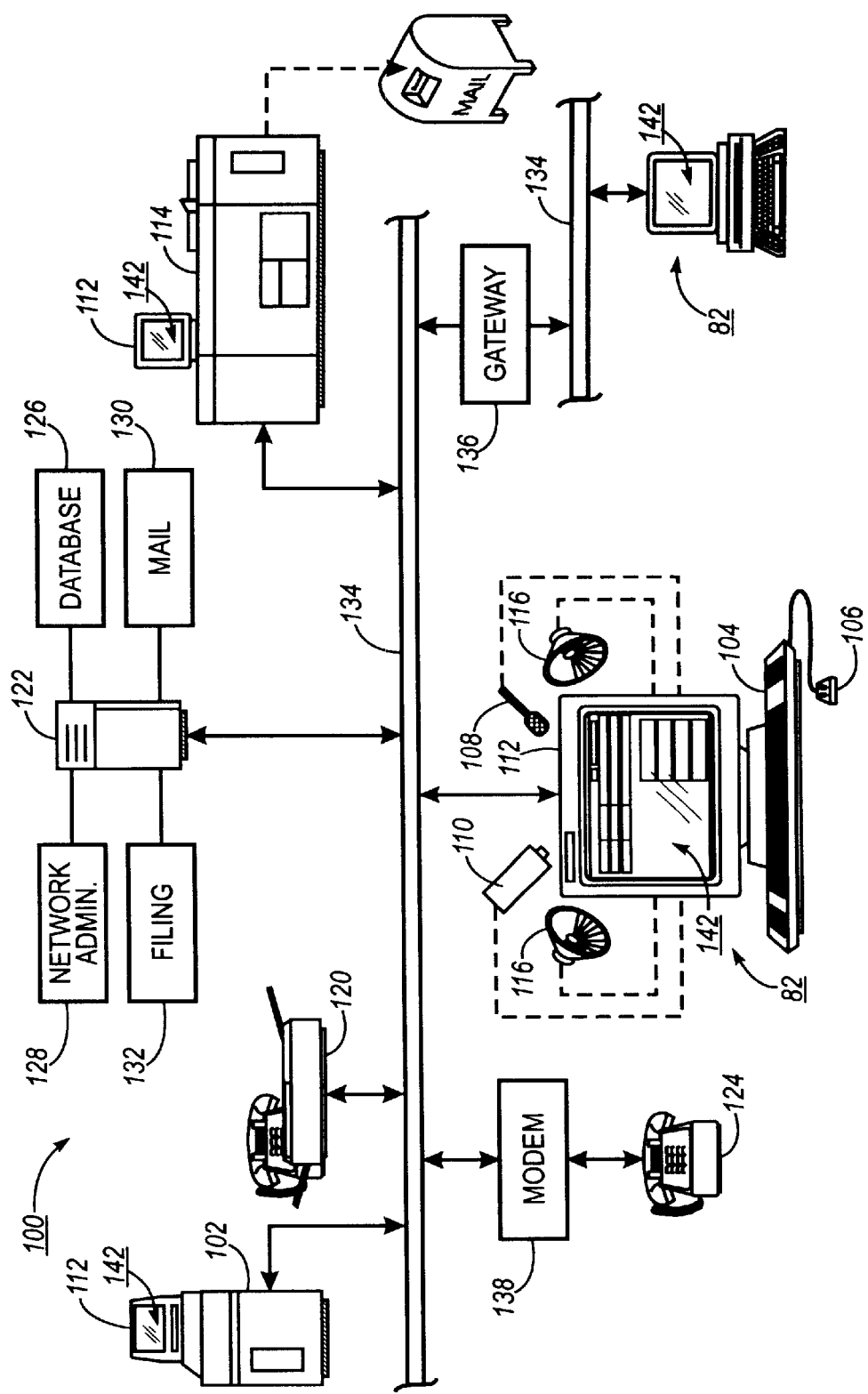
FIG. 1 is a schematic diagram of a system according to one embodiment of the present invention, in which the methods described herein may be employed.
Figure 3:
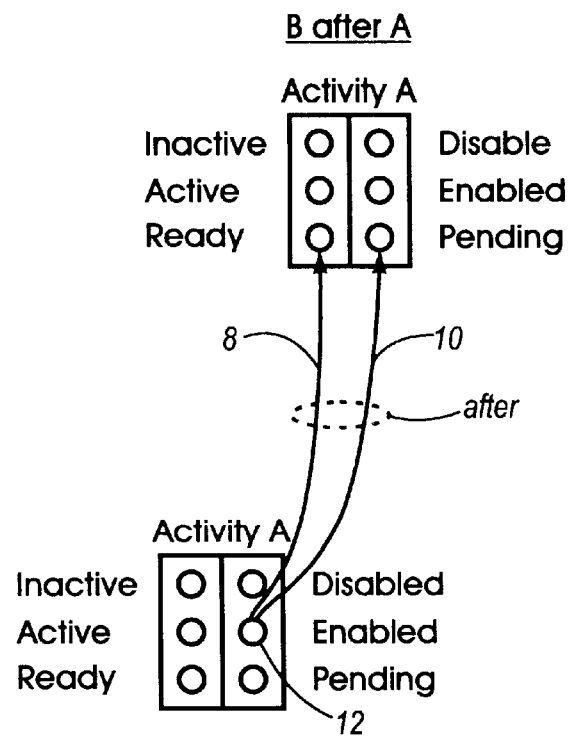
Figure 4:
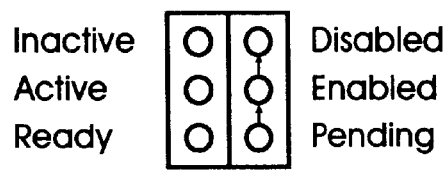
Figure 5A:
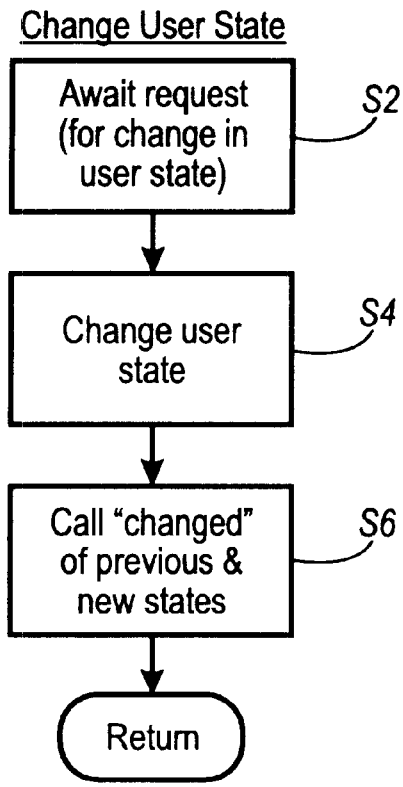
Figure 5B:
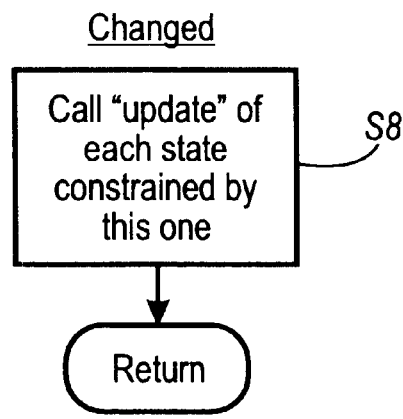
Figure 5C:
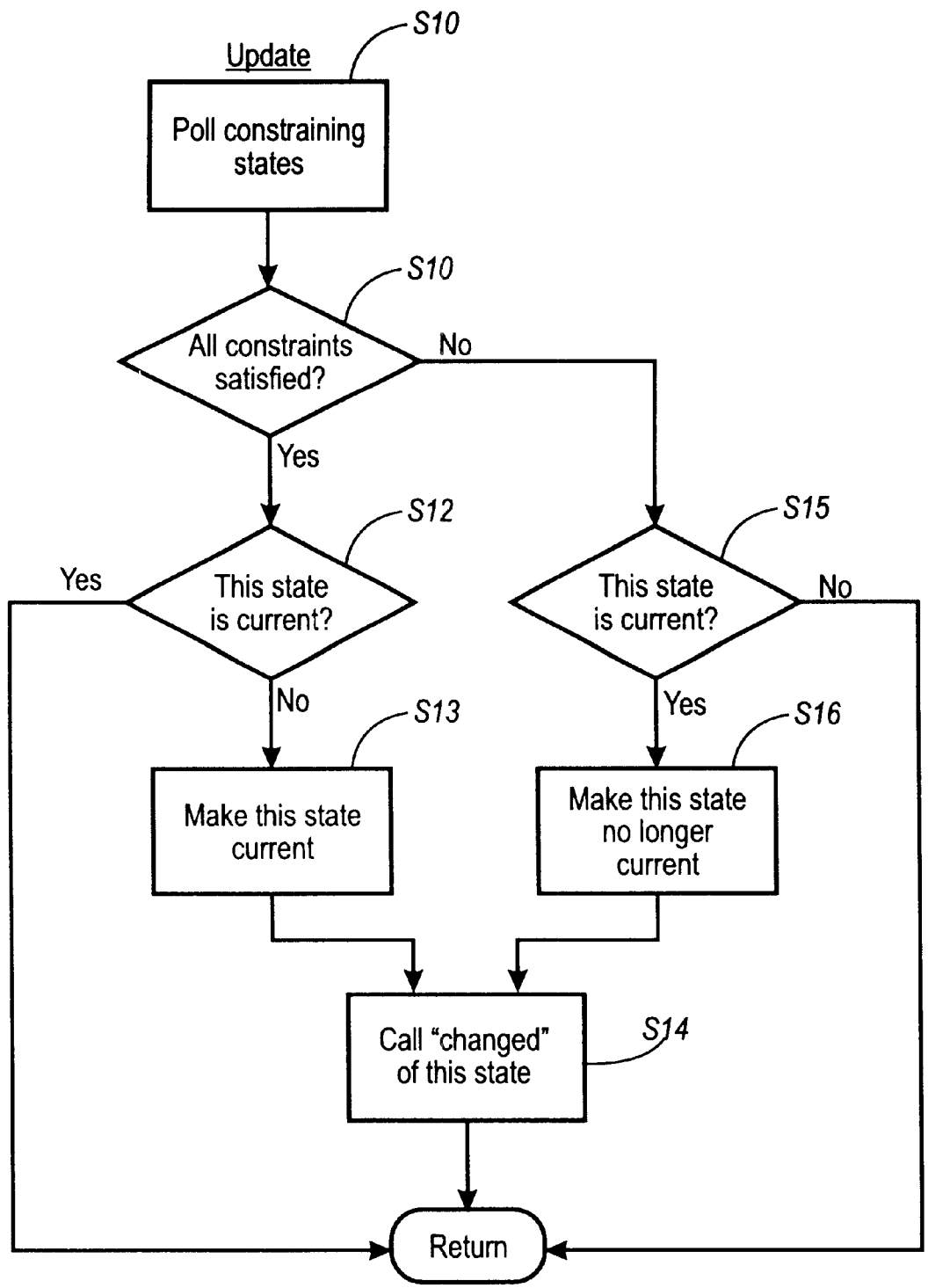
Figure 6:
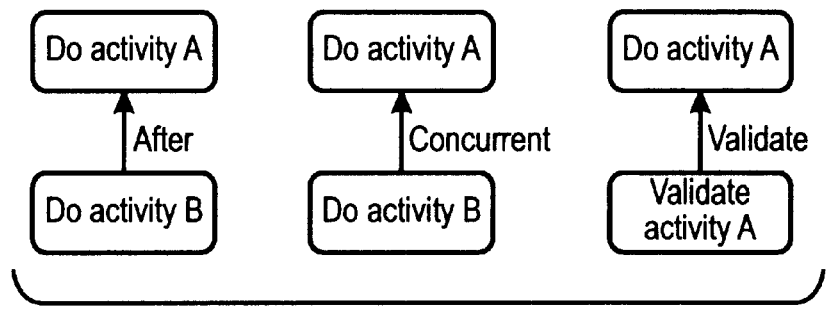
Figure 9:
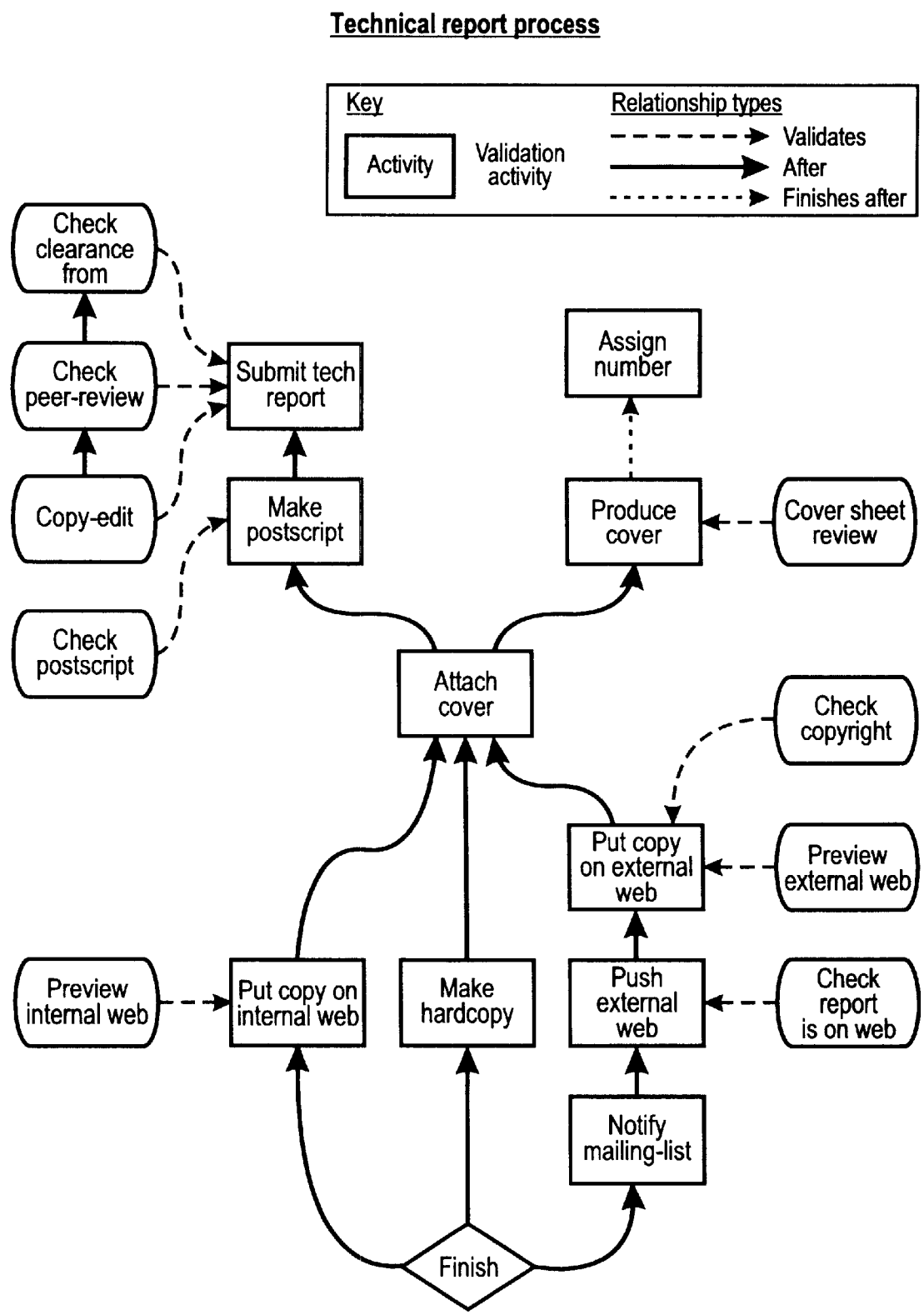
Figure 12:
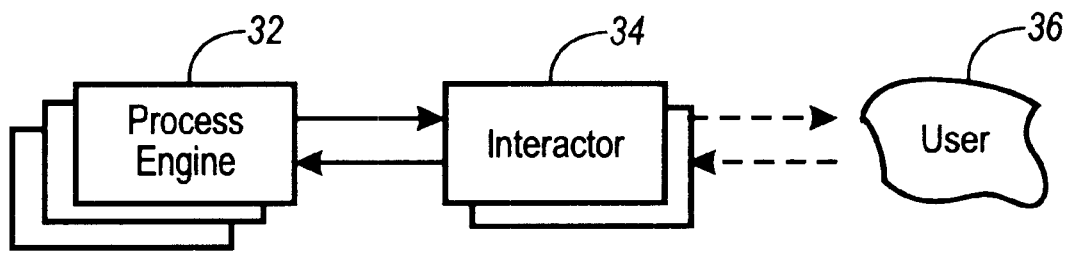
Figure 13:
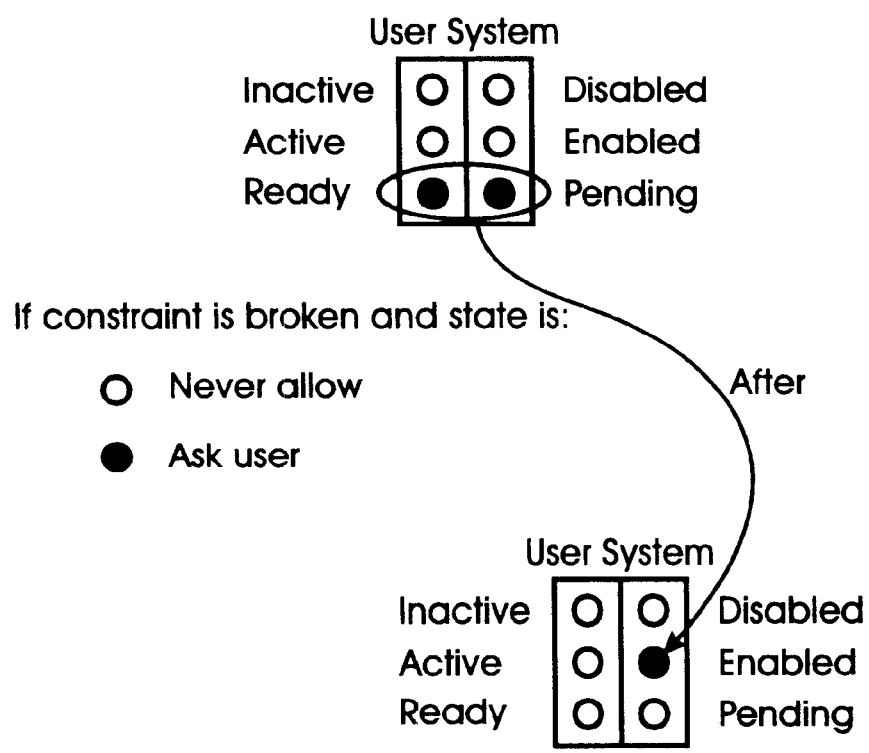
Figure 14:
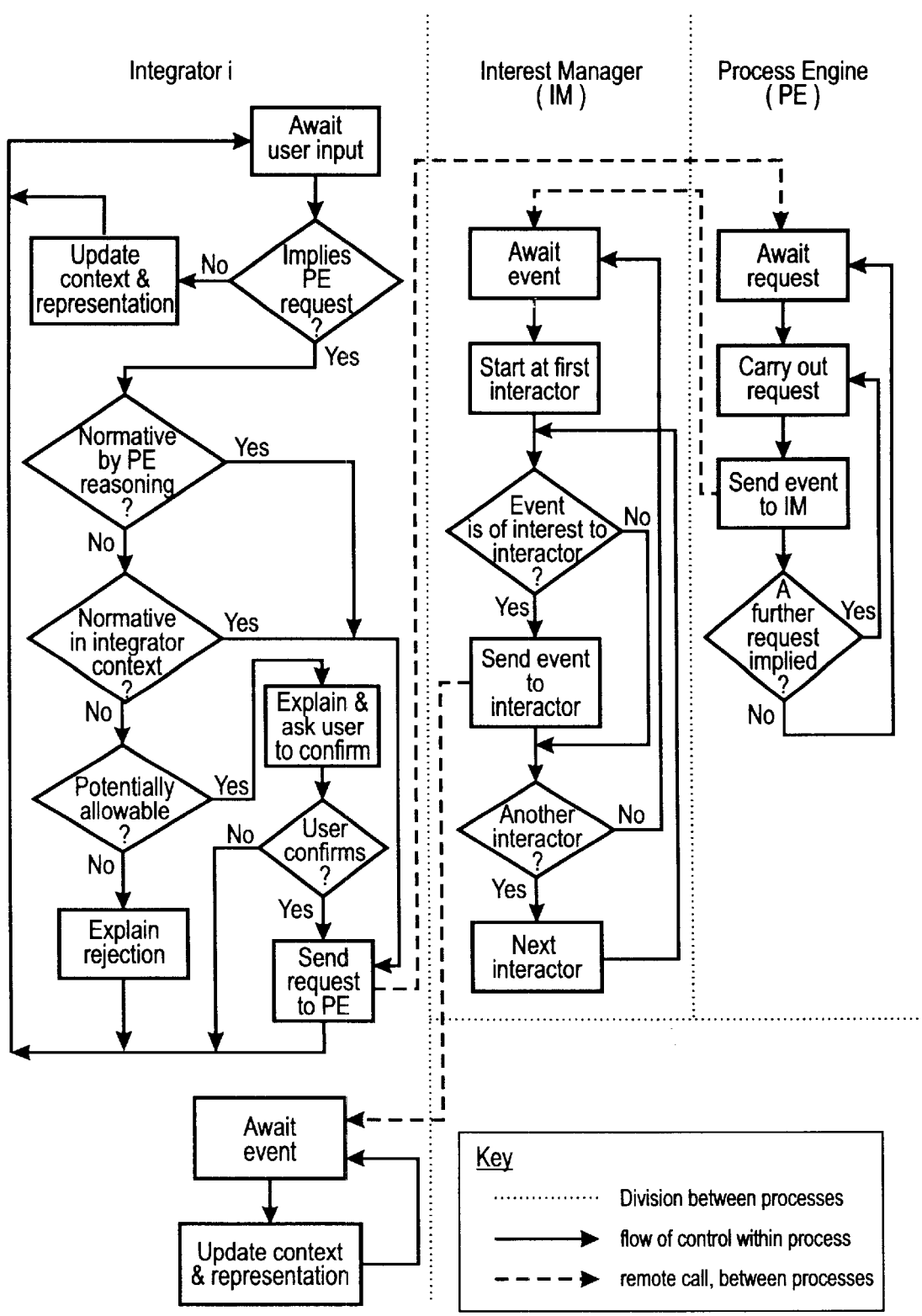
Figure 15:
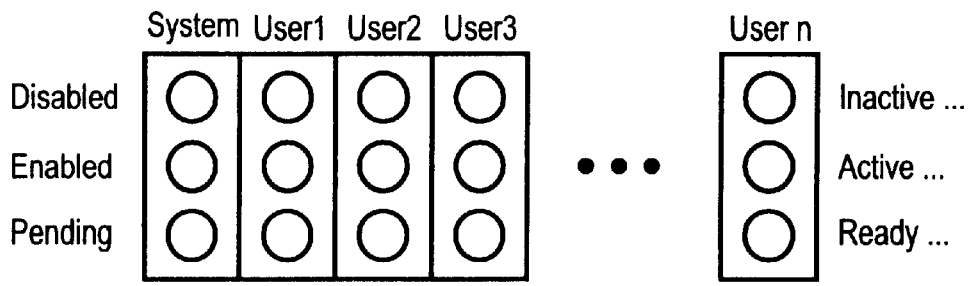
Figure 17:
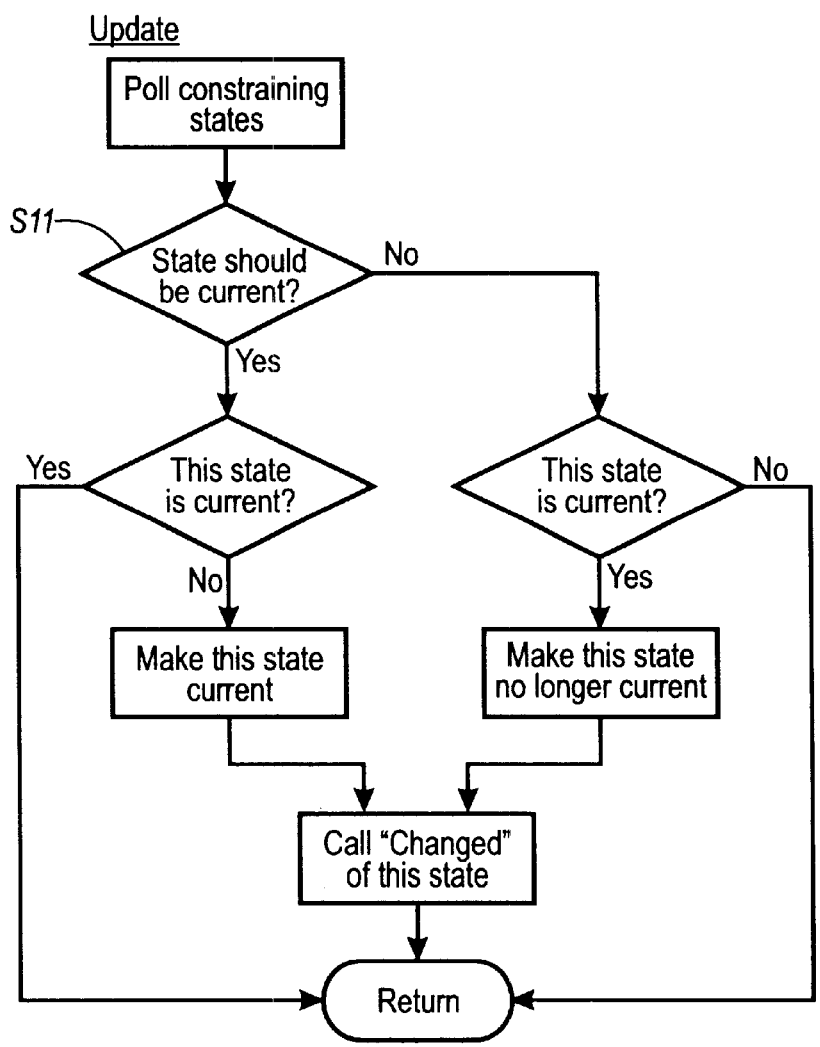
Figure 16:
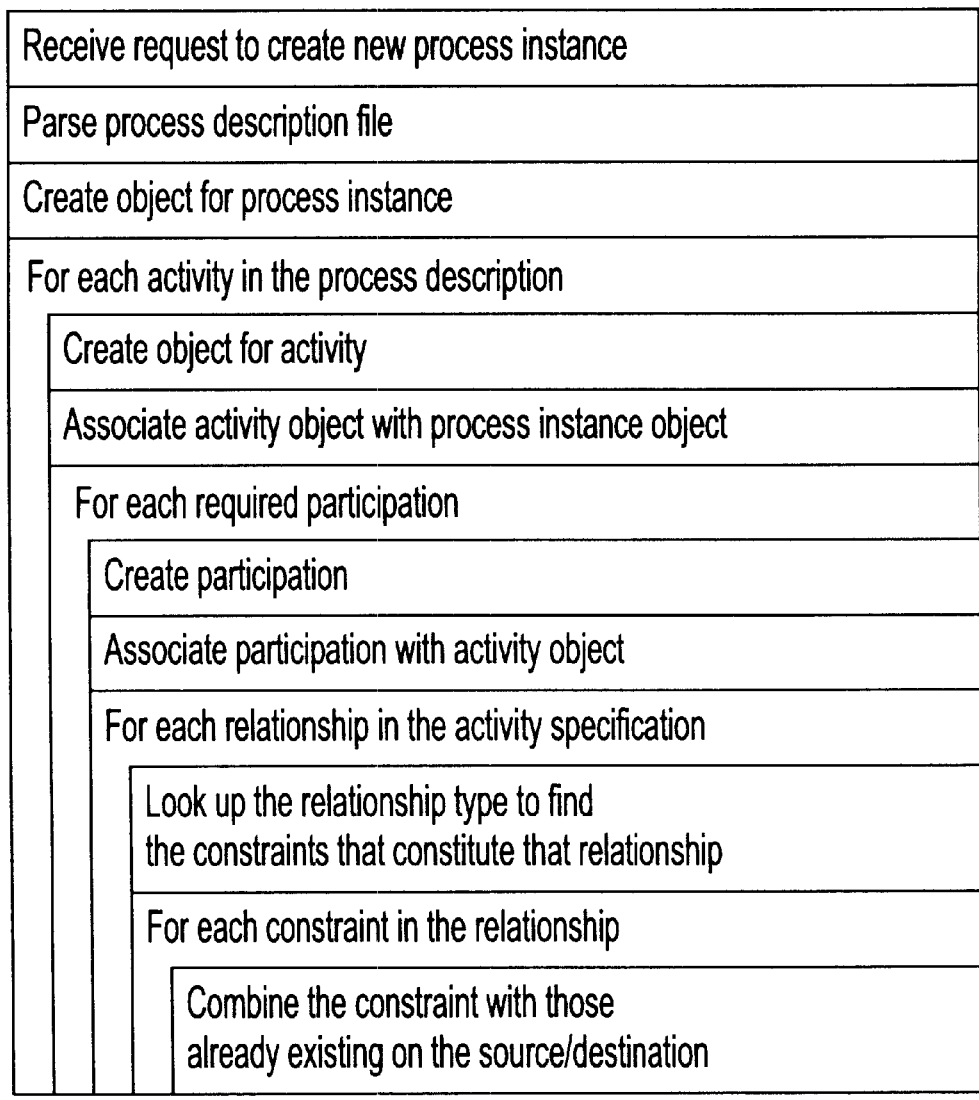
Figure 18:
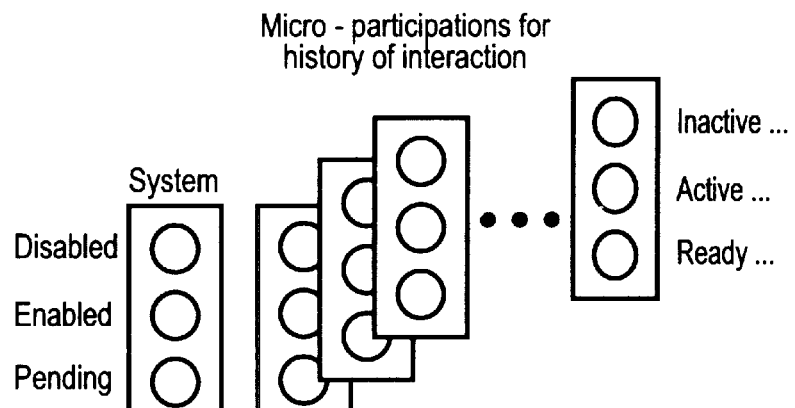
Figure 19:
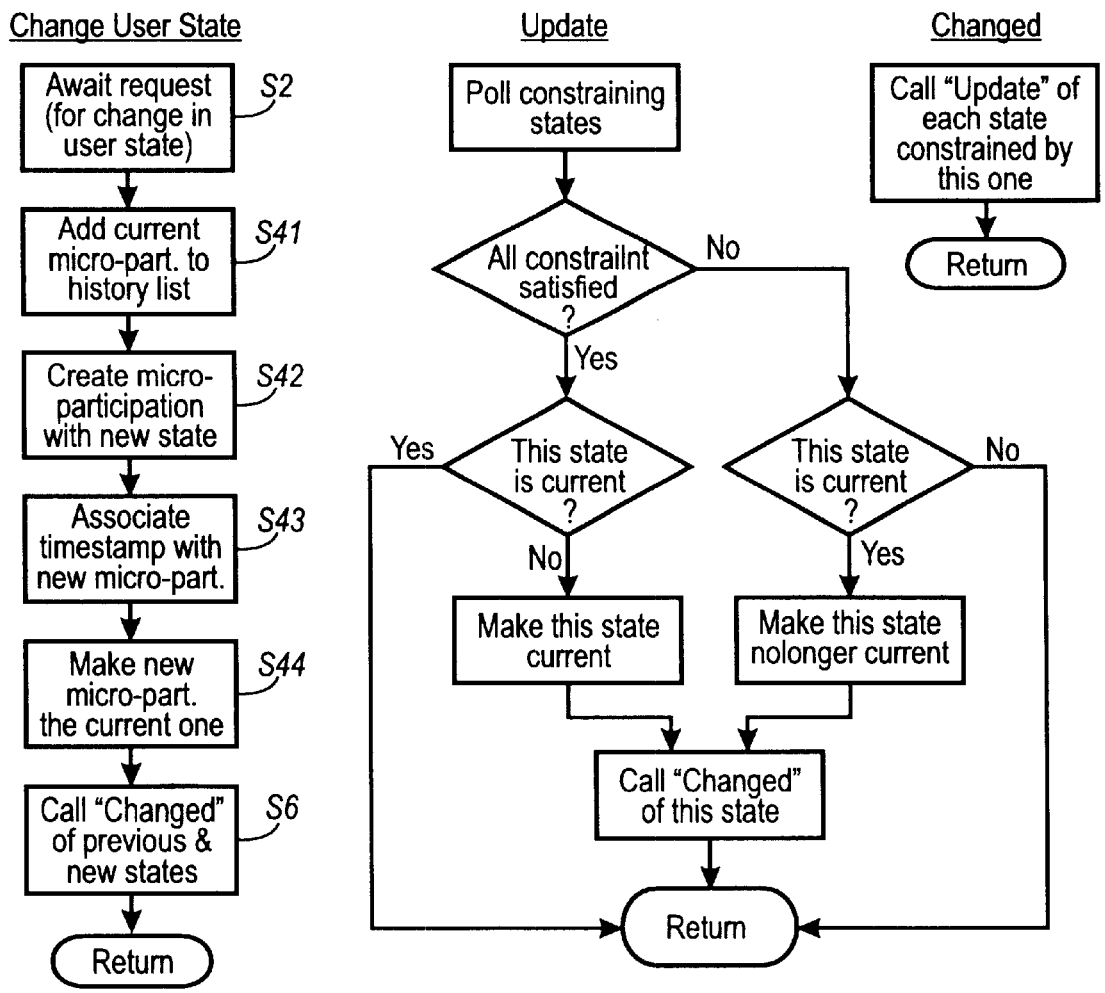

FIG. 3 schematically illustrates the relationship between two activities A and B in one embodiment of the invention;

FIG. 4 illustrates implied intra-activity constraints which may exist for an activity;

FIG. 5 is a schematic flow diagram of the algorithm performing state changes in accordance with the invention;

FIG. 6 shows how three exemplary relationships are modelled at the activity level, in one embodiment of the invention;

FIG. 7 schematically illustrates constraints between activity states for (a) the after relationship and (b) the concurrent relationship of FIG. 1;

FIG. 8 shows schematically the steps involved in the validate relationship of FIG. 6. in sequence, (a) the submission for validation, (b) the response if the result of the activity being validated is accepted, and (c) if it is rejected;

FIG. 9 is a schematic illustration of the model of an exemplary process (making a technical report available) employed in accordance with the invention;

FIG. 10 shows a process description file containing the textual language corresponding to the graphical model of FIG. 9;

FIG. 11 illustrates diagrammatically the algorithm used to decompose the relationship descriptions into constraints between states of activities;

FIG. 12 shows schematically the system structure and information flow to support delegation of decision making in one embodiment of the invention;

FIG. 13 schematically illustrates an example of how actual state values in an initial activity may be used to determine whether the interactor asks a user for a decision about breaking a constraint:

FIG. 14 is flow diagram showing the process, in accordance with one embodiment of the invention, by which decisions are made about whether a proposed activity should be carried out:

FIG. 15 shows a set of user and system states for an activity in one embodiment of the invention, showing the modelling of the assignment of a user state for each of a plurality of users;

FIG. 16 illustrates the algorithm for implementing the process instantiation (FIG. 11), modified to take account of multiple users associated with each activity, in accordance with the embodiment of FIG. 15;

FIG. 17 is a flow diagram of the "Update" routine (FIG. 5(c)) employed, modified to take account of multiple users associated with each activity, in accordance with the embodiment of FIGS. 15 and 16;

FIG. 18 diagrammatically depicts the representation of activities by system state and a plurality of user micro participations, reflecting state changes in a chronological sequence through history, in another embodiment of the invention;

FIG. 19 is a flow chart of the algorithms for implementing the embodiment of FIG. 18.

A. SYSTEM CONFIGURATION

As will be apparent to persons skilled in the art, the present invention may be implemented by means of a suitably programmed conventional computer (or a plurality of such computers networked in a manner well known in the art), such as, for example, a minicomputer running UNIX, or a PC running Windows®.

Referring to FIG. 1, a network document processing system according to one embodiment of the invention, for implementing the techniques described herein, is designated by the reference numeral 100. This system is described in more detail in commonly assigned U.S. Pat. No. 5,790,119 issued Aug. 4, 1998 and which is incorporated by reference herein. As will be recognized, the network 100 can be implemented using a variety of hardware platforms and includes devices for input including scanner or digital copier 102, keyboard 104, pointing device or mouse 106, microphone 108, and video camera 110. The system further has devices for output including display terminal 112, printer 114, and speakers 116. Input/output (I/O) devices include facsimile 120, file server 122, and telephone 124. Server 122 is configured central to or remote from workstation 82 with public, shared and/or private data storage that is differentiated by user access rights. The server 122 includes relational database system 126, network administration system 12B, mail system 130 (e.g. email, voice mail) and data storage and retrieval system 132, and can be physically configured using optical drives, hard drives, floppy drives and/or tape drives. The relational database system 126 provides systems with fast query and retrieval of data.

Workstation 82 operates in a collaborative environment, where users at different workstations 82 can work together in real time to process and distribute public, shared or private information existing in different forms. (Public data is defined herein as data accessible by anyone, shared data is defined as data accessible by a limited number of users and private data is data uniquely accessible by a single user.) Workstation 82 can exist in a distributed or centralised environment. In either environment, workstation 82 is connected to other systems and devices through local area network (LAN) or wide area network (WAN) 134, gateway 136. and/or modem 138. In distributed systems, a number of workstations extend distributed processing and storage capabilities to each other, by providing for example redundant storage or a single mounting of a unique application. It will be appreciated that any of the multiple workstations 82 on the network may comprise a computer having a standard microcomputer (PC) architecture, which is well known in the art.

Workstation 82 includes an object oriented user interface (Ul) 142 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview TM ("GV") software available from Xerox Corporation, which uses abstractions such as a desktop, inbasket, outbasket and documents. Referring still to FIG. 1, the Ul 142 can operate remotely from any system; it is extensible across network services using remote windowing protocols such as X windows ("X Window System", W. Scheifler and James Gettys, Digital Equipment Corporation, U.S., 1992, ISBN 1-55558-088-2). For example, the Ul on printer 114 is available remotely from any workstation 82 or alternate service such as scanner 102.

B. INDEPENDENT SYSTEM AND USER STATES

Figure 2:
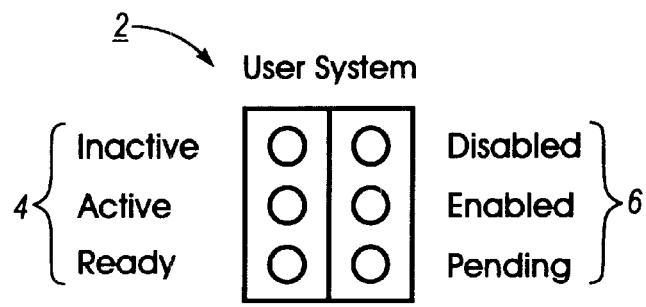
FIG. 2 shows a set of user and system states for an activity in one embodiment of the invention.

Referring to FIG. 2, this shows a representation 2 of an activity in one embodiment of the invention, showing a set of user and system states. The activity may be, for example, creating or adding a contribution to a document, making an amendment to a document (or any of the functionalities conventionally provided by available word-processing, spreadsheet, database or other application software), applying some form of authentication to a document (e.g. approving, signing off), or the like. In this illustrated implementation, an activity is represented with six possible states—three user states 4 and three system states 6. The user states 4 represent how the user is currently interacting with the activity, and are defined as follows.

Inactive means that no user is carrying out the activity.

Active means that a user is working on the activity.

Ready means that a user has declared an activity completed.

The system states 6 represent the states the system believes the activity(ies) to be in, based on resolving the constraints which define the dependencies across activities. The system states 6 are defined as follows.

Disabled means that there are still conditions to be met before the activity can be started according to the underlying model of the process.

Enabled means that all conditions have been met to allow the activity to be started.

Pending means that all conditions have been met to allow the activity to be finished.

The user states 4 and system states 6 are independent and an activity is always in one user state and one system state. When users wait for the system to change to pending before commencing work on an activity, the effect is similar to the three state model of the traditional approach described earlier, in other words, the activities are carried out precisely in accordance with the sequence defined in the process model. However, the technique described here has two properties which allow greatly increased flexibility in the ordering of activities.

Firstly, the representation of the user states 4 allows for system states 6 to be over-ridden, but ensures that the system has a complete record of what is going on. As an example, a user may have information to hand to carry out an activity even though it is still disabled because information required by prior activities has not yet been entered into the system. The traditional approach would require the user to wait until the system was brought up to date, but the technique of this invention allows it to be entered when convenient. (In this situation, an appropriate warning can be given to make sure the user realises the potential mismatch and its implications.)

Secondly, the enabled state allows the system to represent a situation where conditions exist for an activity to be started, but not for it to be completed. A common example of this in knowledge intensive activities is where information has to be gathered from a number of sources. It may be useful to begin carrying out activities such as summarising or collating this information before it is all available; The traditional approach would not allow this to be represented.

In any of these situations, an activity is only fully completed when it is both ready and pending, i.e. the current user and system states are aligned and do not depend on any other uncompleted activities.

Turning to FIG. 3, this schematically illustrates the relationship between two activities A and B in one embodiment of the invention. Through one example, it is illustrated how the required state dynamics are achieved by the propagation of constraints.

FIG. 3 represents the relationship between activities A and B, with each arrowed line 8, 10 representing a constraint. In this case, the simple "after" relationship (i.e. B can only be performed after A is completed) is illustrated, and this relationship ("B after A") is represented by two constraints, corresponding to arrows 8, 10 emanating from the enabled system state 12 of activity B. The required behaviour is for B to be unable to reach the enabled state 12 (and therefore must stay at the disabled state) until activity A is both ready and pending. It is said that enabled of B is constrained by both ready and pending of A. A constraint is said to be satisfied when the constraining state has been reached. The general rule is that a constrained state can only be reached when all of its constraints have been satisfied.

Once all the constraints on a state have been satisfied, the state is reached, the activity does move into that state, automatically. In the "after" example, when both constraints on B.Enabled are satisfied, B moves into enabled. Since there are no further constraints on B.Pending, the activity drops though into that state also. (In this disclosure, A.Active means that the user state of activity A is active, B.Enabled means that the system state of activity B is enabled, and so on.) This "drops through" behaviour can be thought of in terms of implied intra-activity constraints, as illustrated in FIG. 4. The behaviour may or may not be implemented using the same mechanism as the inter-activity constraints described up to now. Thus, conceptually, every activity may have the constraints shown in FIG. 4; and constraints constituting activity relationships are simply added to these. It is only the system states 6 which have this behaviour; on the other hand it is in the nature of the user states 4 that they can move freely under the control of the user and are therefore unconstrained.

An important feature to note about the system dynamics is that constraints are continually maintained, and the mechanism must work to remove an activity from a state, as well as allowing it into one. For example, if activity B (see FIG. 3) reaches pending, but then a constraint on B.Enabled becomes unsatisfied (such as when the user returns from A.Ready to A.Active), the activity pops back up to B.Disabled until the constraints are satisfied once again.

In the preferred embodiment, each activity is created with the above mentioned intra-activity constraints explicitly in place. As each relationship is added during the process instantiation procedure (described in detail in section C below), the constraints which constitute the relationship type are added to the appropriate states. Every state has two lists of references to other states. One is the list of the states that this state constrains, and the other is the list of states that constrain this one. Updating these lists is the action of adding a constraint.

The constraint propagation ignores the relationships themselves, working purely at the level of the constraints they caused to be added. Whenever an activity changes state, all of the states involved in the change inform each of the states they constrain. Whenever a state is informed of a change in any one of its constraining states, it polls all of its constraining states to determine whether it can now be reached. If there is any change in its status, it dutifully informs all of its constrainees.

FIG. 5 is a schematic flow diagram of the algorithm performing state changes in accordance with the invention. (The unconventional use of names associated with portions of the flowchart attempts to allow the diagram to represent the mutually recursive calls between "Update" and "Changed". (In the diagram, calls to a named flowchart portion "of" a state mean that the state is referred to as "this" state within the execution of that portion of the flowchart.)

Referring to FIG. 5(*a*), initially (step s2) a request for a change of user state is awaited. The mechanism is invoked by a call to "Change User State" at step s4 (system states are never changes by means other than constraint propagation). Next, at step s6, a call is made to the "Changed" of the previous and new states; i.e., if the user has requested a change from state A.x to A.y, the routine of FIG. 5(*b*) is performed for each of states A.x and A.y. When the routine of FIG. 5(*b*) has been performed for each of A.x and A.y, processing returns to step s2 (FIG. 5(*a*)).

As illustrated in FIG. 5(*b*), the routine involves (step s8) calling "Update" of each state constrained by this one; i.e. if B.k and B.l are constrained by A.x, the routine of FIG. 5(*c*) is performed for each of states B.k and B.l. When the routine of FIG. 5(*c*) has been performed for each of B.k and B.l, processing returns to step s6 (FIG. 5(*a*)).

Turning to FIG. 5(*c*), in the routine illustrated, only a change in status causes a call to "Change" (FIG. 5(*a*)). Initially the constraining states for the current state are polled (step s10). A check is then made (step s11) to determine what the state should now be. If all constraints are satisfied, a check is made (step s12) of the current status against that desired. If this state is current, the processing returns to step s8 (FIG. 5(*b*)). If this state is not current, it is made current at step s13, and the routine "Changed" (FIG. 5(*b*)) called at step s14.

If, at step s11, all the constraints were not satisfied, a check is made (step s15) of the current status against that desired. If this state is not current, the processing returns to step s8 (FIG. 5(*b*)). If the state is current, this state is made no longer current at step s16. Then, and the routine "Changed" (FIG. 5(*b*)) called at step s14.

The effect of steps s12 and s15 is that only when the current status is different to that desired is the appropriate change made and the routine "Changed" called. In the routine of FIG. 5(c) it may be discovered that there is no need to change anything, such as in cases where (a) all constraints are satisfied and the state was already reached, or (b) not all constraints are satisfied and the state is not marked as current.

C. MULTIPLE RELATIONSHIP (DEPENDENCY) TYPES

Referring to FIG. 6, this shows three exemplary relationships modelled at the activity level—after, concurrent and validate. The activities may be any of those mentioned in section B above.

FIGS. 7 and 8 illustrate how the relationships of FIG. 6 are implemented in one exemplary form, in terms of constraints between states of the activities, using the activity states described in detail in above.

Figure 7A:
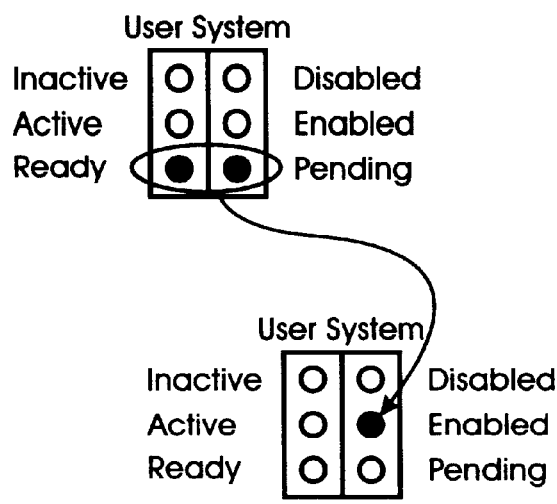

With reference to FIG. 7(a), this diagrammatically shows the after relationship of FIG. 6. This relationship means that an activity should not normally be started until prior activities are completed. (This is similar to a traditional sequential relationship.) The after relationship is defined so that when all the other activities on which an activity depends are done (i.e. ready and pending), then it becomes enabled, which means that as far as the model is concerned, the activity can or should be now be carried out. (In fact, as long as there are no other constraints preventing the pending state being reached, e.g. a validation being required—see below, it will fall immediately through to pending.)

Figure 7B:
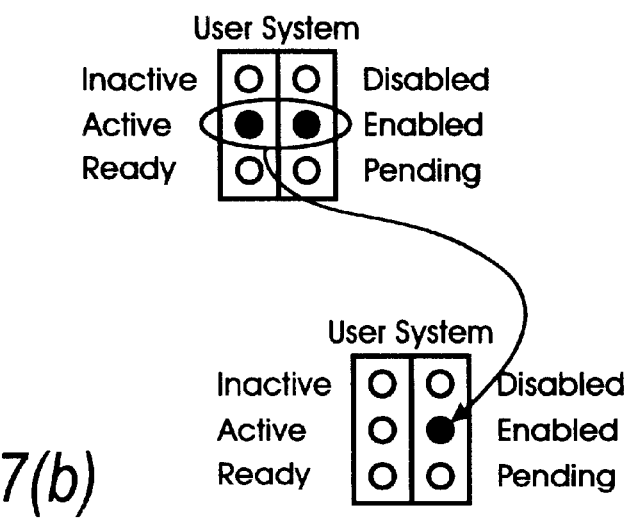

FIG. 7(b) shows a concurrent relationship of FIG. 6, in accordance with which an activity can be started when activities on which it depends have started, but not necessarily completed. The concurrent relationship is defined so that when an activity becomes active and enabled (or pending), then other activities which depend on it also become enabled.

The validate relationship of FIG. 6 is show in FIG. 8. The validate relationship is a two-way relationship which involves information being passed from one person to another and then typically returned to the original person. A typical use of this pattern is in getting the results of an activity signed off, but it may involve modifications of transformations of the original work. (In traditional workflow representations, this kind of pattern is very difficult to represent since, for example, if a piece of work is found to be unsatisfactory it may loop backwards and forwards an arbitrary number of times. Consequently, this may be very clumsy (and difficult) to model.) Although the validate relationship looks like any other relationship at the activity level, the two-way nature of the relationship makes the underlying semantics a little more complicated.

Figure 8A:
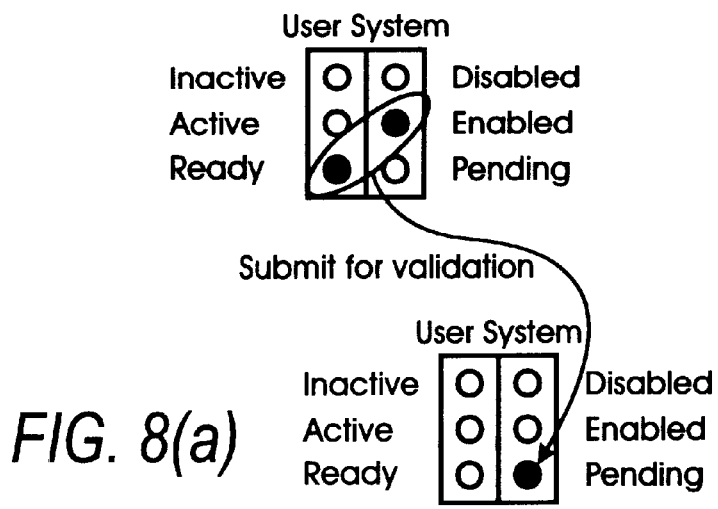

FIG. 8(a) shows the step in the validate relationship of submitting for validation. In a typical case, the system state of an activity to be validated will be held enabled, and when it is deemed ready by the user, the validation activity (normally) becomes pending. This makes it formally available to the person doing the validation.

Figure 8B:
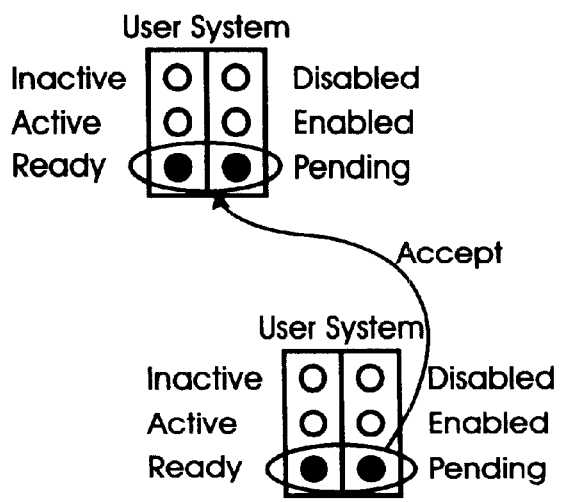
Figure 8C:
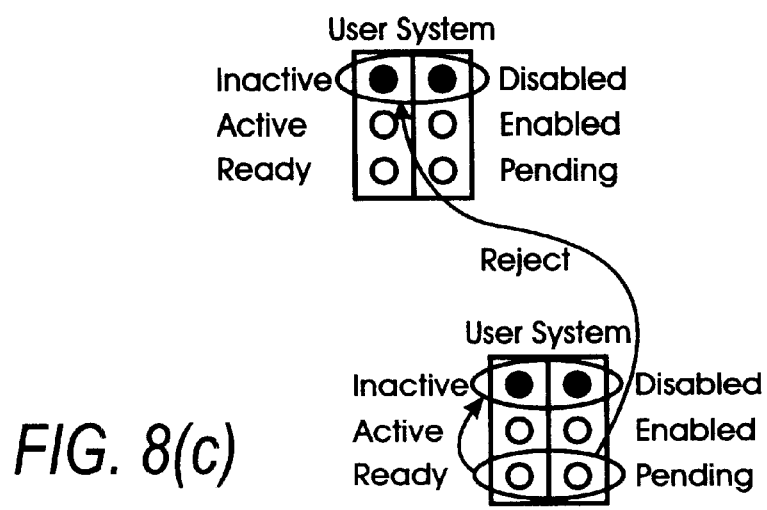

One of two possible responses can be returned to the original user—either accepted or rejected. As shown in FIG. 8(b), if it is accepted, when the validator finishes the validation, the original activity becomes pending, and since it was already ready, therefore becomes fully completed.

Alternatively, the submission may be rejected, in which case the original activity is reset to inactive and disabled. (In fact, since the conditions for carrying out the original activity were probably met before it was submitted for validation, it will normally fall through to enabled and pending, indicating to the user for the original activity that it has to be dealt with again, and so restarting the cycle.) The validating activity is also reset so that it will be ready to receive the revised version to be validated (see FIG. 8(c)). (Feedback about the reason for rejection may also be passed back to the person asking for validation.) FIG. 9 shows a graphical model of the process used in the exemplified case—preparing and making available a technical report, with activities including obtaining clearance for publication, peer review, copy-editing, assigning a number, and making the technical report available on a page of the World Wide Web which is accessible externally.

FIG. 10 shows a process description file containing the textual language corresponding to the graphical model of FIG. 9 The process description file in FIG. 10 defines each activity of the process by giving a name, and specifies its relationships (or "dependencies") with other activities. The process description file comprises a set of activity specifications 51, 52, 53, 54, ... etc., one for each activity in the process. For example, taking the fourth activity specification 54, it can be seen that the activity "copy-edit" has two relationships, one of the type validates with "submit-tech-report", and the other of type after with "check-peer-review". In each activity specification, the first element in the bracketed list after the activity names ("one of ( ... )"/"any of ( ... )"/"nobody") is a means of one or more users to an activity.

The algorithm which is used to decompose the dependency descriptions (after, concurrent, etc.) into a set of activities with constraints specified between states of the activities, is set out in the Nassi-Schneidermann diagram of FIG. 11. (It will be appreciated by persons skilled in the art that this is only one possible method of implementing the invention, and that numerous other techniques may be implemented which take advantage of the typed dependencies in accordance with the invention.)

The algorithm of FIG. 11 uses typed, directed relationships (dependencies) between activities. In the preferred embodiment, the activity-level relationships are resolved into constraints on states of the activities, at the time of instantiation. This means a lot more processing work at that time, but also speeds the processing of state changes. It will be understood that it is quite possible to compute the significance of having a relationship at the time any state of the activity at either end changes, but this would make the system somewhat slower.

Specifically, the algorithm operates as follows.

Step 61: receive request to create new process instance—the algorithm is fired-off. It is useful to consider the Process Engine (discussed further below) as an object that sits around waiting to be asked to do various tasks, process instantiation. being one of them.

Step 62: parse process description file—read the file shown in FIG. 10, converting the textual content into internal representations of the specification. Parsing techniques are well known in the art. Specifically, the process description file comprises multiple activity specifications; and the process of parsing the file is that of extracting the process-type name ("tech-report") and the activity specification information.

Step 63: create object for Process Instance, i.e. create a Process Instance object. It will be appreciated that the present invention is suitable implemented using object-oriented programming techniques. An object may be defined as some data and some code describing its behaviour. In the case of the process instance object, this maintains state: a mapping from activity names to activity objects, and another from resource names to their current values.

For each activity in the process description.

Step 64: create object for activity, i.e. create an activity object. An activity object comprises some data (its name, its state, etc.), and some code that makes it behave like an activity object should, so its state changes appropriately depending on the state of its related activities, and it informs its related activities if its state does change, etc.

Step 65: associate activity object with process instance object. An activity object maintains a record of the process instance it is part of, and a process instance maintains a list of its comprising activity instances. This step is the setting-up of these records.

For each relationship in the activity specification.

Step 66: look up the relationship type to find the constraints (see above) that constitute that relationship.

For each constraint in the relationship.

Step 67: combine the constraint with those already existing on the source/destination. This step comprises take the activity object currently being set up, and taking the activity object that is intended as the destination of the dependency being constructed, and add a constraint between the states specified, and in the direction specified in the dependency specification.

It will be appreciated that the above described technique may be used in conjunction with that described in section B above:

D. CONFLICT RESOLUTION

Referring to FIG. 12, according to the invention a process engine 32 has access to models, stored in memory in a manner well known in the art, of processes based around structured sets of activities. Each activity may be, for example, creating or adding a contribution to a document, making an amendment to a document, applying some form of authentication to a document, or the like. In addition, an interactor 34 mediates between the process engine 32 and the user 36. (It will be appreciated that the configuration of FIG. 12 is a simplified form—there may be one or more further modules mediating between the process engine 32 and the interactor 34. For example, the current implementation of the invention also includes an interest manager which allows multiple interactors 34 to be used simultaneously and keeps track of what information each is interested in.)

The interactor 34 is the focus for providing the user with information about available activities as well as being the focus for interacting with them. The interactor 34 registers for all changes in process (activity) state which are relevant for the facilities it provides. However, in addition to simply reflecting the current state of activities as represented via the process model, it provides a mechanism for tailoring how the process engine responds to conflicts which result from a requested change of state (for example, if the user requests access to an activity which is not yet formally ready to be acted on; i.e. in the example disclosed in section B above it is not yet in the enabled state). Exemplary states for the activities are discussed in further detail below.

At one extreme, it may be deemed appropriate, either because of the nature of the process (e.g. safety critical), or because of the person using it (e.g. a trainee) that no constraints should be broken. In this case (akin to the "traditional model" discussed in some detail in section B above), the interactor 34 automatically refuses to allow any constraints to be broken and the user is not presented with, or is refused permission to begin, an activity which is not ready to be started.

At the other extreme, it may be deemed that a particular process is sufficiently ambiguous and tolerant of error, or the user is sufficiently expert that it should be entirely at the user's discretion whether or not the constraint should be broken. In this case, the interactor 34 passes information to the user about which activities are causing a constraint to be broken and the user decides whether or not to go ahead.

The more difficult case is when it may be appropriate to break a constraint to carry out some activities, but not others. In such a case the interactor has to be able to determine whether or not to allow the user the choice of breaking the constraint. According to the invention, two mechanisms have been developed to provide this.

D1. Different Relationships (Dpendencies)

The first mechanism adds information to the relationships between activities in the process (model) description. There are a number of ways that this can be done. In one exemplary embodiment the relationships are simply specified as "hard" or "soft". For example, a "hard" relationship may be used for specifying the situation there are physical constraints which make one activity impossible to carry out without another being completed, or may be used to make sure that safety critical issues are not overlooked. A "soft" relationship signifies that it is not generally appropriate to carry out a particular activity out of sequence. but recognises that there may be times when it should be allowed.

Thus, using these concepts the interactor 34 is responsible for making sure a hard relationship (and the constraint(s) corresponding to it) is not broken, but it passes on a query. to the user 36 about whether it is appropriate to break a soft relationship (and the constraint(s) corresponding to it). It is important to note that these are characteristics of the relationship which are not used directly by the process engine 32 to compute the implications of state changes, but provide information to the interactor 34 to help refine the kinds of choices which are available to the user.

In another exemplary embodiment, the dependencies are arrived at on the basis of whether the user or users concerned are "expert" or "novice" (or any predetermined level in-between). That is, information is specified about users with different kinds of skill levels. and it will be appreciated that any number of designation between and including expert and novice may be provided. The interactor 34 thus has this information at its disposal for use as a factor in resolving conflicts. It will also be appreciated that a multitude of combinations of hard/soft constraints with expert/novice factors may be employed.

D2. Inferences

The second mechanism uses information that can be inferred from the state of the process. If sufficient state information is available, it can be possible to determine that an activity is "definitely not ready" or is "nearly ready". For example, it is possible to use the mechanism with user and system states as described in section B above.

With reference to FIG. 13, this schematically illustrates an example of how actual state values in an initial activity may be used to determine whether the interactor asks a user for a decision about breaking a constraint.

If a constraint is broken, additional information can be gleaned from the actual states of the activity. This will be illustrated with reference to the after state in FIG. 13. If the second activity is attempted before the first one is ready, the actual state it is in can be used to set conditions for whether or not the user should have the opportunity to break the constraint. As one example, it may be deemed appropriate to allow the user a choice if someone has declared the state active, or perhaps ready, even if it still depends on other activities to be completed. Alternatively, it may be set so that a choice only gets passed on to the user if the system state of the prior activity is enabled, and not if it is disabled. There is no single precise pattern which determines what decisions should be made where. Rather, where there is ambiguity in the general case,. information about which state values might suggest that the user should be asked about it are accessible to the process engine 32; where the context of the roles being supported by the interactor 34 gives additional information about ambiguities, information about when to ask the user may be stored there; and, of course, the very fact of getting the final decision from the user 36 means that the local contingencies of the particular case being done can determine what actually gets done.

FIG. 14 is flow diagram showing the process, in accordance with one embodiment of the invention, by which decisions are made about whether a proposed activity should be carried out. As will be seen from FIG. 14, the key aspect is that the technique allows the decision to be made at one of three distinct levels (controlled via the interactor 34). Thus, the decision may effectively be made to be in line with the normative process (model) as instantiated in the process engine 32 (i.e. the "normal" way of doing things). The instantiation process is described in section C above. However, this normative route may be over-ridden by local contextual information stored in the interactor 34, or the user 36 may be asked to make the decision.

It will be appreciated by persons skilled in the art that this is only one possible method of implementing the invention, and that numerous other techniques may be implemented in accordance with the invention which vary from the algorithm set out in FIG. 14. For example, the illustrated technique assumes that information about the current state of the process is cached within the interactor. Depending on system performance considerations, it may be more appropriate to query the process engine for current status when a PE request, (see FIG. 14) is made.

In addition, the above described technique may be used in conjunction with those described in sections B and C above.

E. MULTIPLE USER STATE SETS

This section describes embodiments of the present invention building on the techniques described in sections B, C and D above; and these embodiments employ the same state model and techniques as described in those sections, except as described below.

E. 1. Multi-user Participation

The above-mentioned sections B–D described only one user associated with an activity at any one time. That technique is extended in the embodiment described in this section by introducing a mechanism to allow multiple users to be associated simultaneously with an activity and describes some ways in which this representation can be used.

In the single user participation situations (see section B) an activity is only fully completed when it is both ready AND pending—i.e. the user and system states are aligned and do not depend on any other uncompleted activities. With multiple user participations, the situation is more complex, both in terms of how participations are created and how they are used.

The approach taken requires at least one user participation. However, further participations may be defined in a number of ways. For example:

a) There may be a pre-defined number of user participations for a given activity.

b) An activity may be defined to allow an arbitrary (or maximum) number of participations to be created as requested by relevant users.

There are a number of ways in which completion of an activity may be defined. For example:

a) An activity may be defined as complete only when the system state is pending and all user participations signify they are ready.

b) An activity may be defined to be complete when the system state is pending and any one user participation is ready.

c) An activity may be defined to be complete when the system state is pending and a given number, or some other subset of user participations are ready.

Note that such possibilities can be represented at a higher level by extending the kinds of dependencies among activities described in section C. For example by adding a qualifier to the dependency description (e.g. to produce dependencies such as after all; after one).

FIG. 15 shows a set of user and system states for an activity in one embodiment of the invention, showing the modelling of the assignment of a user state for each of a plurality of users. States of activities are represented by parallel "user" and "system" states. The example shows an activity represented with one set of possible system states and a number of sets of possible user states (for User1, User2, User3 . . . Usern) corresponding to different participants involved in the activity. In this example there are three possible states for each set, although a different number of states is possible.

It will be appreciated that when adding or removing a set of user states, it is necessary to maintain the dependencies appropriately. Dependencies are defined in terms of constraints between states. When a new set of user states are added, it is necessary to make sure that we also add constraints to them appropriately, according to the dependencies that the activity has.

One way to do this is by keeping a record of the dependencies that each activity is involved in, and consulting this whenever a set of user states is added or removed.

So, suppose activity B has an AFTER dependency with A: see FIG. 7(*a*). The constraints that comprise this dependency are as shown in FIG. 3.

Note the need to have a constraint running between B.Enabled and A.Ready, like the one labelled 8 in FIG. 3, but when there are several sets of user states, a constraint like this is needed for EACH one. So whenever a user is added, the list of relationships is checked and the new set of user states is assigned with appropriate constraints. Conversely, whenever a dependency is added, all of the sets of user states in the activity must be considered, and constraints added appropriately.

An alternative scheme to this is as follows—to have another state for each activity, called "Done" hereinafter, which essentially summarises the completion status of the activity. A.Done is constrained by A.Pending every A.Ready. The AFTER dependency type can then be defined with ONE constraint. Now B.Enabled is constrained by A.Done.

Where there is only one set of user states, the purpose of Done may not be readily apparent, but consider now that we want to add another set of user states to activity A. The states are added, and we wire them in by adding a constraint from Done to Ready. The result is that Done is constrained by Pending on the system side, and all of the Readys on the user side. It was unnecessary to consult the record of relationships and manipulate related activities—those other activities all refer to Done, and the constraints on Done have been updated. Having Done as a common point of reference means it is unnecessary to do us much processing when we add or remove a set of user states, and also when we add or remove dependencies with other activities. On the other hand, it does mean another state per activity to deal with, but this is the currently preferred implementation of multiple sets of user states.

Additional difficulties come in when it is desired to have dependencies of the type "After-one". mentioned above. As well as allowing the more general kinds of constraint, as discussed below with reference to FIG. 3, it is necessary to consider how each of the techniques for sensibly adding sets of user states described above is impacted by this requirement. The first technique is unchanged. The "Done" state is insufficient for "After-one". but we could add another state to function in the same way as the Done state, but which becomes current when there exists any user state in Ready. The after-one dependency type then refers to this state (called "ready-exists") in the same way as "After" refers to "Done".

Where the number of participations that are to be associated with an activity is known at the time that activity is created, processing may be amended by adding an extra step in the process instantiation algorithm, which is expressed in the diagram of FIG. 11.

FIG. 16 illustrates the algorithm for implementing the process instantiation, but modified to take account of multiple users associated with each activity, in accordance with the embodiment of FIG. 15. It will be seen that the modification consists of inserting steps (designated 68, 69) between the steps of "Associate activity object with a process instance object" and "For each relationship in the activity specification". The steps inserted comprise, for each required participation (user participant), "Create participation" (step 68), wherein a new state set, i.e. comprising three user states, is created corresponding to this participant, and "Associate participation with activity object" (step 69).

Steps 68, 69 are required if participations (sets of user states) are known at the time of instantiation. This would be the case if the activity descriptions contained this information and the parser were coded so as to extract it.

More specifically, the modified algorithm comprises examining the internal representation of the activity specification and executing steps 68, 69 once, for each required participation, the additional steps comprising:

Step 68: create participation, i.e. create a participation (set of user states) object.

Step 69: associate participation with activity object, i.e. in the activity object, add the participation object to its list of associated participation objects. For the participation object, identify the activity object as being the activity object to which it belongs.

To provide for a variable number of participations for an activity, it is necessary to be able to dynamically add (and potentially remove) participations from activities. Whenever this is done, it is necessary to inform constrained states that they now have to reassess whether they are current, given the addition or removal of a participation. The routine "Changed" (see FIG. 5(b)) already does this; it is called for each state (inactive, Active, Ready) of a participation upon its addition or deletion.

FIG. 17 is a flow diagram of the "Update" routine employed in accordance with the embodiment of FIG. 15, modified to take account of multiple users associated with each activity. The algorithrm for performing state changes in accordance with the invention is the same as in FIG. 5, except that in the routine of FIG. 5(c), step 11 is modified to check whether the state should be current.

For the case mentioned above where an activity is only considered to be finished when its user state is Pending and all of its participations are Ready, and there is only a simple After dependency type, the only change to the implementation required to have multiple user participations is that explained in the four preceding paragraphs above.

However, the issues of providing (1) the dependency type after-one, and (2) providing for the case where activity completion is defined to be when the system state is pending and some proper subset of the user participations are ready, complicate the constraint-satisfaction part of the implementation. The following discussion addresses those complications.

So far the principle has been that a constrained state becomes the current state of the activity when all of its constraints have been satisfied, and that a constraint has associated with it exactly one constraining state, which must be current within its activity for the constraint to be considered satisfied. The after-one dependency type, and the idea that activity completion can be achieved by reaching ready in any fewer than all participations associated with the activity, lead to the requirement that constraint satisfaction be more general.

The principle used so far may be characterised as exclusively employing the universal quantifier in determining whether a constrained state can be considered current (i.e., "for all" constraining states, that constraining state is current). Some generality can be attained by permitting the use of the existential quantifier (i.e., "there exists" a constraining state that is current). This allows us to say that a state is reached when any one or more of its set of constraining states becomes current, which provides the basis for an after-one dependency type.

More expressiveness is required if it is desired to say that an activity is defined to be complete when the system state is pending and a given number , or some other subset of user participations are ready. Firstly, it is necessary to be able to express that a state is reached when a certain number (other than 1 or all) of its constraining states are current, e.g. using a greater-than operator, as is well-known to those skilled in the art. Secondly, it is necessary to be able to combine the kinds of expressions we have identified so far, into compound expressions. In particular, it is necessary be able to say "the system state is pending AND a given number . . . are ready". The logical operator AND, and the other operators of Boolean algebra, which are well known to those skilled in the art, may be used to generalise the expressiveness of the relations employed.

In view of the above, the only change to the flowcharts of FIG. 5 is for the wording in the first decision box in FIG. 5(c) to be changed to "State should be current?".

The above techniques assume that all user participations are involved (or potentially involved) in "doing" the activity. However, a similar technique can be used to support participation in an activity in other capacities. For example:

a) "giving input".

b) "taking output".

In these cases, the participation is used to flag, and potentially give access to, contact people who are responsible for processes which produce input on which the current activity relies, or who will take the output from the current process. The possible states are used to allow for, mark and give feedback on work being done on these related processes without the person (people) responsible for the current process having to have access to the details of these related processes. In addition, the "giving input" participation can mark rework being done on an input process.

Another capacity which this technique can be used for is what may be regarded as a "supervisory" capacity. A specific example of this can be found in some classes of validation activity as described in section C above. The technique described here can be used as alternative way of implementing these relationships.

E.2. Participation Histones

The techniques disclosed in sections B to D above do not have any mechanism for tracking the history of interaction with an activity. The embodiment described in this section extends the techniques already described by representing a number of parallel "micro-participations" for each user involved in an activity. This allows the history of interaction to be recorded, for example, to support any necessary rework or to support. reflection on the process.

FIG. 18 diagrammatically depicts the representation of activities by system state and a plurality of user micro-participations, reflecting state changes in a chronological sequence through history, in another embodiment of the invention.

In accordance with this embodiment, states of activities are represented by a "system" state and a series of "user micro-participations" which reflect the state changes through which the history of user interaction with the particular activity has gone. The example of FIG. 18 shows an activity represented with one set of system states and a number of these micro-participations. In this example (and the current implementation) there are three possible states for each set, although different states are possible.

The system states are the same as described previously. The set of micro-participation states represent the state of a user's interaction with the system over time. For each micro-participation:

Inactive means that no user is currently working on the activity

Active means that the activity is currently being worked on by a user

Ready means that the given activity element has been declared complete by the user.

The system state is independent from the micro-participations. In addition, however, the interaction history micro-participations build up over time. Each time the user state changes, the previous state is preserved, and a new micro-participation is added. There are at least four ways in which this can be used:

(a) At the level of the state history, it allows non-standard patterns, for example re-work after a validation has failed, to be tracked. *p1 (b) The micro-participation also acts as a focus around which additional information about what happened while the activity was in the state recorded. This can include the duration of the state, and what resources such as documents or other people were involved. In this way, for example, the documents used to support a particular revision of a piece of a piece of work can be identified later, perhaps if it has to be further re-worked.*

(c) Although the default assumption is that a single user will be responsible for a given activity, this mechanism allows for the possibility of someone else picking up the work if it is reworked.

(d) As a further modification of (c), it also allows the work to be handed over to someone else part way through and the changeover can be recorded as a new micro-participation.

Under this scheme, an activity is fully completed when it is both ready and pending—i.e. the system state and the most recent micro-participation are aligned and do not depend on any other uncompleted activities. However, it also allows it to be re-opened if a new micro-participation is created which is inactive (e.g. as a result of a validation failure) or ready (e.g. because re-work is being carried out).

FIG. 19 is a flow chart of the algorithms for implementing the embodiment represented in FIG. 18. This algorithm is the same as FIG. 5, except as described below.

A different "Change User State" routine is employed to implement the embodiment represented in FIG. 18, in which step 4 is replaced by steps s41 to s44. Thus, at step s41 (once a request for change in user state has been received), the current micro-participation (state condition) is added to the history list—a list of predetermined length giving a condition (state) of-each of the micro-participations up to and including the previous one in chronological order. (It will be appreciated that when it comes to resolving constraints (discussed elsewhere), it the current micro-participation which is used in the constraint resolving routine.)

Next, at step s42, a micro-participation is created with a new state. Then, the new micro-participation created in step s41 is associated (step s43) with a timestamp (e.g., including date, time). At the subsequent step s44 the new micro-participation is made the current one, and the processing proceeds to step s6 and continues as described in section B above.

Note also that the techniques described in this section could also be used to augment the multiple user participation scheme described in section E.1 above: micro-participations could be used for each user participation.

It will be appreciated by persons skilled in the art that the implementation of any of the above-described techniques may be done in alternative ways.

What is claimed is:

1. A method carried out in a data processing system for coordinating a process involving at least one activity, said at least one activity being performed by at least one user, comprising the steps of:

for said at least one activity, assigning a system state from a plurality of possible system states, each system state corresponding to an activity-related condition of the system, characterised by further including providing means for storing a process model, the process model being a model of the process notionally defining the circumstances in which said at least one activity is performed; and for said at least one activity, assigning a user state from a plurality of possible user states, each user state being a state of the activity assigned in dependence upon a detected activity-related condition of the user, wherein said system state is assigned in accordance with the process model, and the system state and the user state for the activity are independent.

2. The method of claim 1, further including the step of changing the system state of an activity in response to a change in a user state, or changing the user state of an activity in response to a change in a system state.

3. The method of claim 1 wherein the step of assigning a user state, or the step of changing the user state, of an activity, is performed in response to a user input.

4. The method of claim 2 wherein the system state of an activity is changed in accordance with the process model.

5. The method of claim 2, relating to at least a first and a second activity, wherein the step of changing the user state and/or system state of the second activity comprises changing said state when the user state and/or system state of the first activity satisfy a predetermined condition.

6. The method of claim 1, further including, for an activity, changing from one system state to another system state automatically upon said one system state being reached.

7. The method of claim 1, wherein there are three possible user states, and/or three possible system states.

8. The method of claim 2, wherein the step of assigning a user state, or changing a user state, comprises, respectively, assigning to an activity, or changing a user state to (a) a first user state (Inactive) if no user is carrying out the activity, (b) a second user state (Active) if a user is working on the activity, or (c) a third user state (Ready) if a user has declared an activity completed, and further wherein the step of assigning a system state, or changing a system state, comprises, respectively, assigning to an activity, or changing a system state to (d) a first system state (Disabled) if there are still conditions to be met before the activity can be started according to the predetermined model, (e) a second system state (Enabled) if all conditions have been met to allow the activity to be started, and/or (f) a third system state (Pending) if all conditions have been met to allow the activity to be finished.

9. The method of claim 1, wherein the model defines changes in state of an activity in terms of at least a first dependency type and a second dependency type.

10. The method of claim 9 wherein the first and second dependency types have different strength attributes, said strength attributes defining the degree to which a corresponding dependency may be overridden.

11. The method of claim 9 wherein the first (hard) dependency type is such that the change of user state requested by the user may not occur unless a predetermined set of states in another activity has been reached.

12. The method of claim 9 wherein the second (soft) dependency type is such that the change of user state requested by the user may occur without a predetermined set of states in another activity having been reached, provided the interactor has received an input from the user indicating that such a change of user state may occur.

13. The method of claim 9 wherein the first dependency type and/or the second dependency type is related to a designator of the user's status.

14. The method of claim 13, wherein the designator defines one of a plurality of possible skill levels, and wherein the interactor determines that the corresponding dependency may be overridden only if said one skill level is above a predetermined level.

15. The method of claim 1, comprising: for said at least one activity, assigning a user state from one of a plurality of predetermined user states, assigning a system state from one of a plurality of predetermined system states, the system state and the user state being independent, and associating each system state so assigned with a plurality of assigned user states.

16. The method of claim 15 wherein each of the plurality of assigned user states comprises an assigned user state for said at least one user.

17. The method of claim 15 wherein the plurality of assigned user states comprises a plurality of chronologically sequential user assigned user states, and may include the currently assigned user state.

18. A data processing system for coordinating a process involving at least one activity, said at least one activity being performed by at least one user, said system comprising:

means for assigning a system state from a plurality of possible system states for each activity of said at least one activity, each system state corresponding to an activity-related condition of the system, means for storing a process model, the process model being a model of the process notionally defining the circumstances in which said at least one activity is performed; and means for assigning a user state from a plurality of possible user states for each of said at least one activity, each user state being a state of the activity assigned in dependence upon a detected activity-related condition of the user, wherein said system state is assigned in accordance with the process model, and the system state and the user state for the activity are independent.

* * * * *